United States Patent
Ramakrishnarao et al.

(10) Patent No.: US 10,013,164 B2
(45) Date of Patent: Jul. 3, 2018

(54) OPTIMIZING ACCESS TO UNIVERSAL INTEGRATED CIRCUIT CARD (UICC) FILES IN A USER EQUIPMENT (UE)

(71) Applicant: Samsung Electronics Co., Ltd., Gyeonggi-do (KR)

(72) Inventors: Ravikiran Ramakrishnarao, Bangalore (IN); Thejeswara Reddy Pocha, Bangalore (IN)

(73) Assignee: Samsung Electronics Co., Ltd (KR)

( * ) Notice: Subject to any disclaimer, the term of this patent is extended or adjusted under 35 U.S.C. 154(b) by 330 days.

(21) Appl. No.: 14/810,041

(22) Filed: Jul. 27, 2015

(65) Prior Publication Data

US 2016/0162192 A1 Jun. 9, 2016

(30) Foreign Application Priority Data

Dec. 3, 2014 (IN) .......................... 6090/CHE/2014

(51) Int. Cl.
| | |
|---|---|
| *G06F 17/00* | (2006.01) |
| *G06F 3/06* | (2006.01) |
| *H04W 8/18* | (2009.01) |
| *H04W 4/00* | (2018.01) |
| *H04W 4/60* | (2018.01) |

(52) U.S. Cl.
CPC .......... *G06F 3/0604* (2013.01); *G06F 3/0643* (2013.01); *G06F 3/0679* (2013.01); *H04W 4/003* (2013.01); *H04W 4/60* (2018.02); *H04W 8/183* (2013.01)

(58) Field of Classification Search
None
See application file for complete search history.

(56) References Cited

U.S. PATENT DOCUMENTS

| | | | |
|---|---|---|---|
| 7,062,259 B1* | 6/2006 | Dispensa | H04W 8/20 370/351 |
| 8,024,514 B2* | 9/2011 | Feather | G11B 15/6835 711/111 |
| 2008/0212222 A1* | 9/2008 | Feather | G11B 15/6835 360/69 |
| 2013/0152159 A1* | 6/2013 | Holtmanns | G06F 21/00 726/1 |
| 2014/0335825 A1* | 11/2014 | Babbage | H04L 63/0853 455/411 |
| 2015/0007348 A1* | 1/2015 | Holtmanns | H04W 4/003 726/28 |

\* cited by examiner

*Primary Examiner* — Hung Le
(74) *Attorney, Agent, or Firm* — The Farrell Law Firm, P.C.

(57) ABSTRACT

A method and a User Equipment (UE) are provided for optimizing access to Universal Integrated Circuit Card (UICC) files in the UE. The method includes storing, by the UE, at least one File Control Parameter (FCP) file corresponding to a plurality of Elementary Files (EFs); and sending, by the UE, a command directly to the UICC, based on the at least one FCP file. The command includes one of a READ command and an UPDATE command.

20 Claims, 14 Drawing Sheets

OPTIMIZING ACCESS TO UNIVERSAL INTEGRATED CIRCUIT CARD (UICC) FILES IN A USER EQUIPMENT (UE)

PRIORITY

This application claims priority under 35 U.S.C. § 119(a) to Indian Patent Application Serial No. 6090/CHE/2014, which was filed in the Indian Property Office on Dec. 3, 2014, the entire disclosure of which is incorporated herein by reference.

BACKGROUND

1. Technical Field

The present disclosure relates generally to communications equipment, and more particularly, to a method and apparatus for optimizing access to Universal Integrated Circuit Card (UICC) files in a User Equipment (UE).

2. Description of Related Art

Restricting the use of a cellular or wireless terminal to a particular purpose or application is a useful feature that has yet to be optimized. Typically, a wireless terminal registers itself on a wireless network when the power is turned on. A smart card, such as a Subscriber Identity Module (SIM) card, which is inserted inside the wireless terminal, contains registration files that allow the wireless terminal to register with a network. For wireless networks such as Global System for Mobile Communications (GSM), Universal Mobile Telecommunications System (UMTS), or Long Term Evolution (LTE), the SIM is just one component of several other modules within a Universal Integrated Circuit Card (UICC).

The UICC is inserted into the wireless terminal, and when the wireless terminal is powered on, registration information, such as an International Mobile Subscriber Identity (IMSI), LOCation Information (LOCI), subscriber information, security keys information, Public Land Mobile Network (PLMN) information, etc., is used to register the wireless terminal with the wireless network. Thereafter, the wireless terminal may use services offered by the wireless network.

Generally, there are several Elementary Files (EFs) (e.g., Transparent type, Linear type, Fixed type, and Cyclic type) defined in a Universal Subscriber Identity Module (USIM) or an Internet Protocol (IP) Multimedia Services Identity Module (ISIM) or a Code Division Multiple Access (CDMA) SIM (CSIM) or any other Network Access Application (NAA) in the UICC specification, where the file size or total number of records and the size of each record is not fixed, and there is a Short File IDentifier (ID) (SFI) value defined in 3rd Generation Partnership Project (3GPP)/European Telecommunications Standards Institute (ETSI) specifications. The ETSI and 3GPP specifications have defined default SFI values for several EFs present in the UICC and the NAA application of the UICC. The SFI values can be used by a UE to perform an "implicit SELECT" operation while performing READ or UPDATE or SEARCH operation on the EFs. Also, there are several EFs whose file size or total number of records and record size are not fixed, as per the specification, and depend on the contents available.

For example, when there is a need to read the complete contents of the EF with the SFI whose file size is not fixed, the SFI value cannot be used for an "implicit SELECT" operation as the total size of the EF is unknown. Hence, an "explicit SELECT" operation is performed on the EF in order to retrieve File Control Parameter (FCP) values of the EF so that the total file size can be determined by the UE. Thereafter, the file size information is used by the UE to send a READ command to the UICC.

Due to the above-described limitations of not having file size information of the EF, the SFI value, even though defined, cannot be used efficiently due to the SELECT operation having to be performed on the EF to query the FCP values. Currently, there is no method of knowing the file size or the total number of records and the size of each record of the EFs, without performing the SELECT operation.

Thus, a need exists for providing a method to optimize access to the UICC files in the UE, thereby decreasing the UICC initialization time and improving the user experience significantly.

SUMMARY

The present disclosure is made to address at least the above-described problems and/or disadvantages and to provide at least the advantages described below.

Accordingly, an aspect of the present disclosure is to provide a mechanism for optimizing access to UICC files in a UE using an FCP file.

Another aspect of the present disclosure is to provide a mechanism for directly sending one or more commands to a UICC, which uses a Short File Identifier (SFI) (e.g., a READ command (Read Record, Read Binary), an UPDATE command (Update Record, Update Binary), or a SEARCH RECORD command), based on an FCP file, without retrieving FCP characteristics of an elementary file using a SELECT command and a GET RESPONSE command.

Another aspect of the present disclosure is to provide a mechanism for storing an FCP file corresponding to a plurality of EFs in a UICC.

Another aspect of the present disclosure is to provide a mechanism for storing an FCP file corresponding to a plurality of EFs in a UE.

Another aspect of the present disclosure is to provide a mechanism for storing each FCP associated with an elementary file SELECTed and READ, in order to perform SFI access in a power cycle by a UE.

BRIEF DESCRIPTION OF THE DRAWINGS

The above and other aspects, features, and advantages of certain embodiments of the present disclosure will be more apparent from the following description when taken in conjunction with accompanying drawings, in which.

DETAILED DESCRIPTION OF EMBODIMENTS

Figure 1:
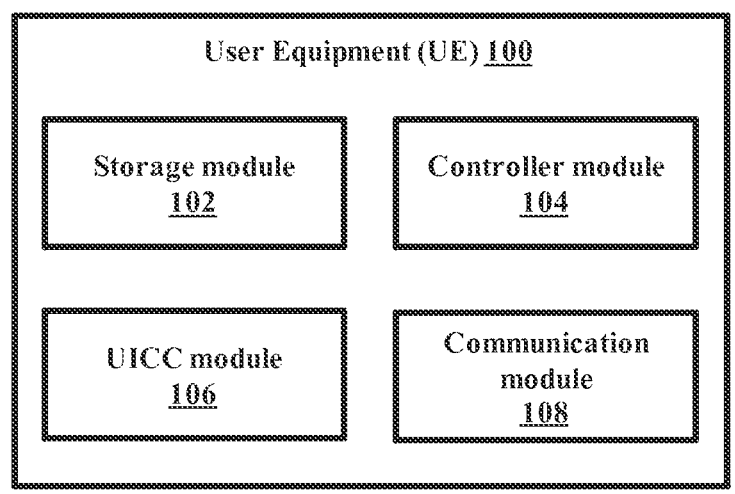
FIG. 1 illustrates a UE for optimizing access to UICC files, according to an embodiment of the present disclosure.

Various embodiments are described in detail below with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

Herein, reference may be made to "an", "one", or "some" embodiment(s). This does not necessarily imply that each such reference is to the same embodiment(s), or that the feature only applies to a single embodiment. Single features of different embodiments may also be combined to provide other embodiments.

As used herein, the singular forms "a", "an", and "the" are intended to include the plural forms as well, unless expressly stated otherwise. It will be further understood that the terms "includes", "comprises", "including", and/or "comprising", when used herein, specify the presence of stated features, integers, steps, operations, elements, and/or components, but do not preclude the presence or addition of one or more other features integers, steps, operations, elements, components, and/or groups thereof.

As used herein, the term "and/or" includes any and all combinations and arrangements of one or more of the associated listed items.

Unless otherwise defined, all terms (including technical and scientific terms) used herein have the same meanings as commonly understood by one of ordinary skill in the art to which this disclosure pertains. It will be further understood that terms, such as those defined in commonly used dictionaries, should be interpreted as having meanings that are consistent with their meanings in context with the relevant art, and will not be interpreted in an idealized or overly formal sense unless expressly so defined herein.

Throughout the description the terms "Memory" and "Storage" may be used interchangeably.

The embodiments herein disclose a method and a UE for optimizing access to UICC files in the UE. The method includes storing one or more FCP files corresponding to a plurality of EFs, and directly sending one or more commands to the UICC based on the one or more FCP files, where the command includes a READ command or an UPDATE command. The FCP file may be used to send the command directly to the UICC, without retrieving FCP characteristics of the EFs using a SELECT command and a GET RESPONSE command. Further, the FCP associated with the EF SELECTed and READ are stored in the UE, where the stored FCP associated with the EF is used to perform SFI access in a power cycle by the UE.

In another embodiment, the FCP file is stored in the UICC of the UE. For example, the FCP file is stored at each directory (i.e., Dedicated File (DF)) level, or in a non-volatile memory of the UE, where an Integrated Circuit Card IDentifier (ICCID) value of the UICC is used as an index to store the FCP file.

In an embodiment, the FCP includes a fixed default SFI value, a variable file size, a total number of records, a size of each record associated with each EF, and Tag Length Value (TLV) information.

In an embodiment, each FCP file corresponds to one or more applications in the UICC. For example, the applications include a Universal Subscriber Identity Module (USIM), a Subscriber Identity Module (SIM), an Internet Protocol (IP) multimedia Services Identity Module (ISIM), and a CDMA SIM (CSIM).

As described above, in conventional systems, when file size information of an EF is not available, a defined SFI value cannot be used efficiently because a SELECT operation will have to be performed on the EF in order to query FCP values. Conventionally, there is no method of knowing the file size or the total number of records and the size of each record of the EFs, without first performing the SELECT operation.

Unlike conventional systems, a method in accordance with an aspect of the present disclosure optimizes EF access by storing FCP values of EFs including fixed default SFIs. A READ or UPDATE command is sent to a UICC, without retrieving FCP characteristics of each individual EF. As such, the SELECT and GET RESPONSE commands do not have to be performed.

FIG. 1 illustrates a UE for optimizing access to UICC files, according to an embodiment of the present disclosure.

Referring to FIG. 1, the UE 100 includes a storage module 102, a controller module 104, a UICC module 106, and a communication module 108.

The storage module 102 stores one or more FCP files corresponding to a plurality of EFs. Each FCP file corresponds to one or more applications in the UICC where the application can be, e.g., the USIM, the SIM, the ISIM, and the CSIM. Further, the storage module 102 may store each FCP associated with the EF SELECTed and READ where the stored FCP associated with the EF is used to perform the SFI access in the power cycle by the UE 100. Further, the storage module 102 may use an ICCID value of the UICC as an index to store the FCP file.

Further, the storage module 102 stores the control instructions to perform various operations in the UE 100.

In accordance with an embodiment of the present disclosure, the FCP includes a fixed default SFI, a variable file size, a total number of records, a size of each record associated with each EF, and TLV information.

The controller module 104 may directly send one or more commands to the UICC, based on the FCP file. For example, the commands may be a READ command or an UPDATE command. In accordance with an embodiment of the present disclosure, the FCP file is used to send the command directly to the UICC, without first retrieving the FCP characteristics of the EF using the SELECT command and the GET RESPONSE command.

The UICC module 106 interfaces with the UE 100, as will be described in more detail below in conjunction with the FIG. 2.

The communication module 108 sends commands to the UICC and receives response information from the UICC.

Unlike the above-described conventional systems, a separate storage of the UICC EF's selected FCP values, such as the file size, total number of records, and the size of each record, can be retrieved without first performing a SELECT operation on each EF.

In accordance with an embodiment of the present disclosure, the FCP file information in the UE 100 can be stored based on an EF_ICCID value and can be used across the power cycles by the UE 100.

may have a new TLV including details of the EF_FCP's file size and other details. As a result, the EF_FCP may be read using the SFI, without having to perform the SELECT operation on the EF_FCP. The EFs having a default SFI specified in the specifications (e.g., USIM, ISIM, and CSIM) and having variable file sizes or numbers of records and record sizes are listed in the EF_FCP file. Also, more than one EF may share the same values, e.g., like EF-ARR details, and the EFs can be listed in the TLV string.

An EF_FCP may include a TLV string, as shown below in Table 1.

TABLE 1

| EF_FCP Content Description | Len(hex) | Value | | | | |
|---|---|---|---|---|---|---|
| BER-TLV tag | 1 | 0x80 | | | | |
| Data length | xyh | 0xXh | | | | |
| EF Details (Transparent EF) | 5 + x | EF Details Tag 0x81 | Length Yyh | EF ID 6Fxx | SFI yyh | File Size xxyyh |
| EF Details (Linear Fixed/Cyclic EF) | 8 | EF Details Tag 0x82 | Length yyh | EF ID 6Fxx | SFI yyh | No. Of Records Xxh | Record Length xxyyh |

Further, when the EFs are SELECTed and READ, the UE 100 can maintain a database of each EF's FCP file values. Thereafter, when the same EF is to be selected, the stored FCP file values can be used to perform the SFI access. All of the stored EF's FCP file details can be indexed against the EF_ICCID value of the UICC. For example, an array of the EF_ICCID values may be used depending on the UE 100 implementation. During a next power cycle, if the EF_IC-CID value is matched against the stored database values, the values can be used to perform the SFI access.

Although the FIG. 1 illustrates the UE 100 including the storage module 102, the controller module 104, the UICC module 106, and the communication module 108, it is to be understood to a person of ordinary skill in the art that the UE 100 may include additional and/or alternative modules communicating among each other along with other components.

Figure 2:
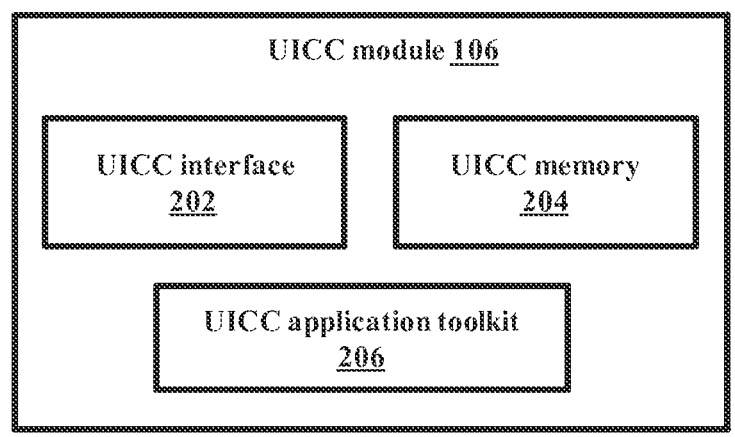
FIG. 2 illustrates sub-modules in a UICC module of a UE, according to an embodiment of the present disclosure.

FIG. 2 illustrates sub-modules a UICC module of a UE, according to an embodiment of the present disclosure.

Referring to FIG. 2, the UICC module 106 includes a UICC interface 202, a UICC memory, and a UICC application toolkit 206.

The UICC interface 202 interfaces with the UE 100.

The UICC memory 204 stores an FCP file corresponding to a plurality of EFs. Further, the UICC memory 204 may store each FCP associated with EFs that are SELECTed and READ. The stored FCP associated with the EF is used to perform SFI access in a power cycle by the UE 100. In accordance with an embodiment of the present disclosure, the FCP file may be stored at each directory (i.e., DF) level.

The UICC application toolkit 206 may directly send a command to the UICC, based on the FCP file. For example, the command may include a READ command or an UPDATE command. In accordance with an embodiment of the present disclosure, the FCP file is used to send the command to the UICC, without retrieving the FCP characteristics of the EF using the SELECT command and the GET RESPONSE command.

In accordance with an embodiment of the present disclosure, the FCP file details may be stored in the UICC at the application level and at each DF level. Similar to the EF_ARR (access rules reference file), the EF can be defined at each DF level (i.e., EF_FCP). The FCP of the parent DF Although FIG. 2 illustrates the UICC module 106 as including the UICC interface 202, the UICC memory, and the UICC application toolkit 206, it is to be understood to a person of ordinary skill in the art that the UICC module 106 may include additional and/or alternative modules communicating among each other along with other components.

Figure 3:
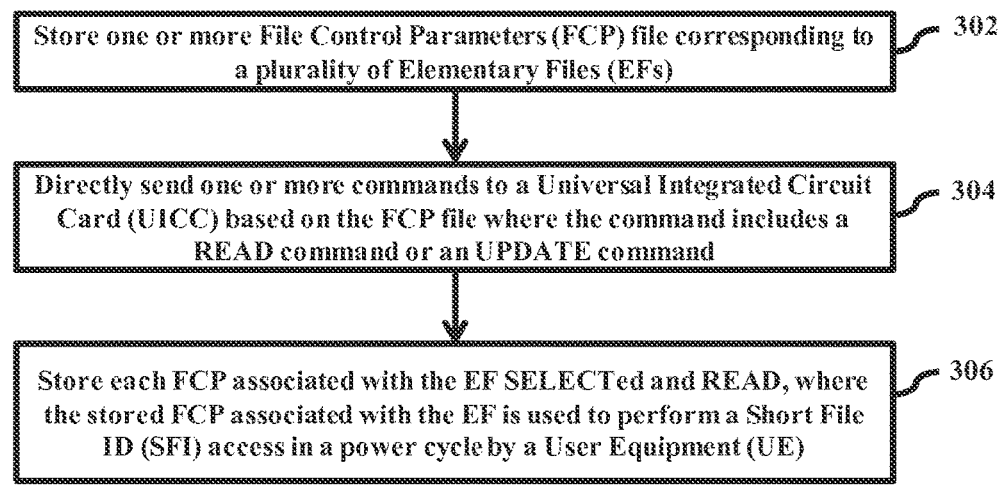
FIG. 3 is a flow diagram illustrating a UE method for optimizing access to UICC files, according to an embodiment of the present disclosure.

FIG. 3 is a flow diagram illustrating a UE method for optimizing access to UICC files, according to an embodiment of the present disclosure.

Referring to FIG. 3, in step 302, the UE stores an FCP file corresponding to a plurality of EFs. For example, referring again to FIG. 1, the storage module 102 stores the FCP file corresponding to the plurality of EFs.

The FCP file may be stored in a non-volatile memory of the UE, using an ICCID value of the UICC as an index.

As another example, referring again to FIG. 2, the UICC memory 204 stores the FCP file corresponding to the plurality of EFs in the UICC memory 204 of the UE 100, such that the FCP file is stored at each directory level.

In accordance with an embodiment of the present disclosure, the FCP includes a fixed default SFI value, a variable file size, a total number of records, a size of each record associated with each EF, and TLV information. Alternatively, each FCP file includes an application in the UICC. For example, the application includes the USIM, the SIM, the ISIM, and the CSIM.

In step 304, the UE directly sends a command to the UICC, based on the FCP file. For example, the command includes a READ command or an UPDATE command.

For example, referring again to FIG. 1, the controller module 104 sends the command directly to the UICC, based on the FCP file.

As another example, referring again to FIG. 2, the UICC application toolkit 206 sends the command directly to the UICC based on the FCP file. As described above, the FCP file is used to send the command directly to the UICC, without first retrieving FCP characteristics of the EF using a SELECT command and a GET RESPONSE command.

In step 306, the UE stores each FCP associated with an EF that is SELECTed and READ. The stored FCP associated with the EF is used to perform the SFI access in the power cycle by the UE.

For example, referring again to FIG. 1, the storage module 102 stores each FCP associated with the EF that is SELECTed and READ. As another example, referring again to FIG. 2, the UICC memory 204 stores each FCP associated with the EF that is SELECTed and READ.

The various actions, acts, blocks, steps, etc., as illustrated in FIG. 3, may be performed in the order presented, in a different order or simultaneously. Further, in some embodiments, some actions, acts, blocks, steps, etc., may be omitted, added, modified, skipped, etc., without departing from the scope of the embodiment.

Figure 4:
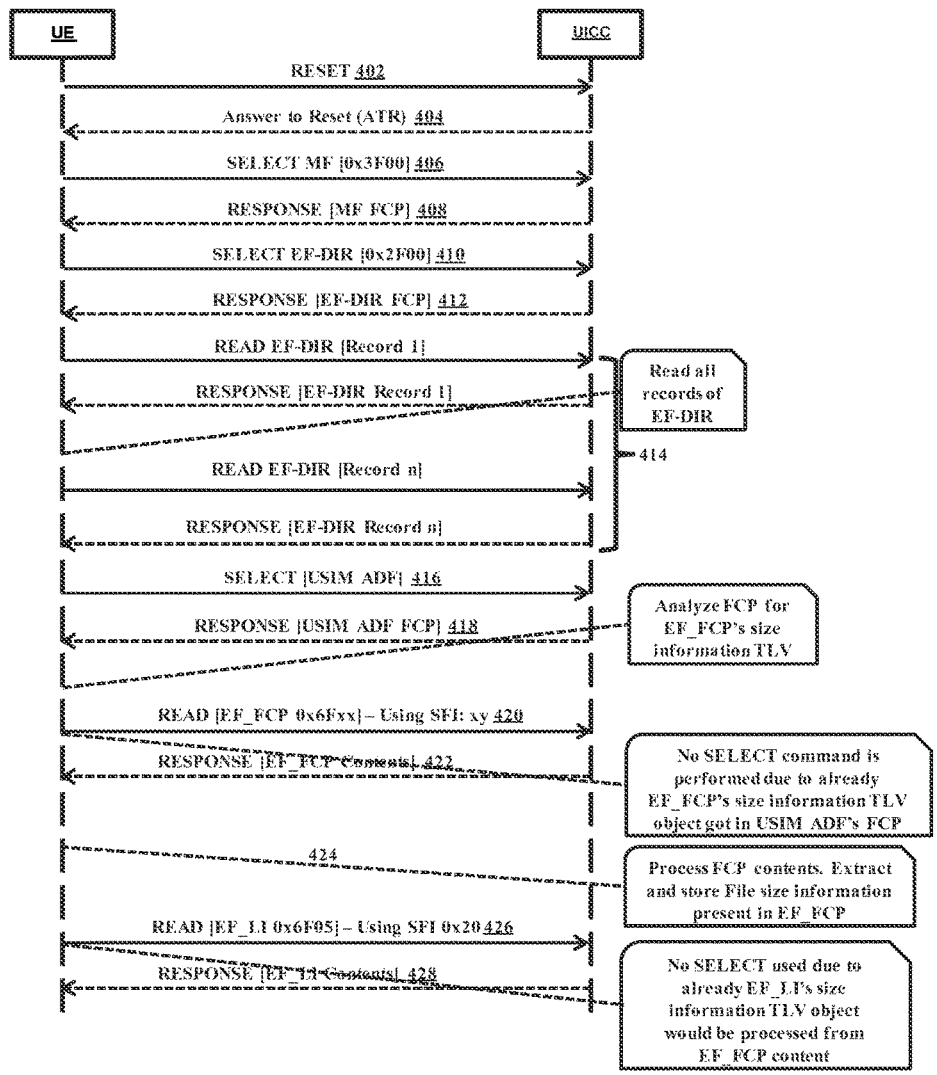
FIG. 4 illustrates a sequence diagram of a UE method for optimizing access to UICC files, according to an embodiment of the present disclosure.

FIG. 4 illustrates a sequence diagram of a UE method for optimizing access to UICC files, according to an embodiment of the present disclosure. Specifically, FIG. 4 illustrates a boot up sequence with EF_FCP usage between a UE and the UICC Referring to FIG. 4, in step 402, the UE sends, to the UICC, a RESET signal (e.g., through the UICC interface 202 as illustrated in FIG. 2). The UE RESETS the UICC by supplying the voltage and a clock signal to the UICC.

In step 404, in response to the RESET signal received from the UE, the UICC sends, to the UE, an Answer to Reset (ATR) including information about a High Speed Protocol (HSP) supported by the UICC. The received ATR from the UICC is then processed by the UE.

In step 406, after processing the ATR, the UE sends, to the UICC, a SELECT command to select a DF master file (MF) (i.e., SELECT MF [0x3F00]).

In step 408, in response to the SELECT command received from the UE, the UICC sends the UE FCP values of the MF (i.e., RESPONSE [MF FCP]).

In step 410, the UE sends the SELECT command for an EF-DIR (i.e., SELECT EF-DIR [0x2F00]) to the UICC.

In step 412, the UICC responds by sending FCP values of the EF-DIR (i.e., RESPONSE [EF-DIR FCP]) to the UE.

In step 414, the UE may READ all the records of the EF-DIR (i.e., Record 1, Record 2, Record 3, etc.) to determine the applications available in the UICC listed in the EF-DIR.

In step 416, for example, the UE sends a SELECT command (i.e., SELECT [USIM ADF]) to the UICC in order to selecting the USIM ADF (Application Directory File).

In step 418, the UICC responds by sending FCP values of the USIM ADF (i.e., RESPONSE [USIM ADF FCP]) to the UE. The UE then parses the FCP values received from the UICC. For example, the FCP values include EF_FCP file size details, where the FCP for EF_FCP's size information TLV is analyzed.

In step 420, the UE READs the EF_FCP file (i.e., READ [EF_FCP 0x6Fxx]) using SFI:xy, without having to perform a SELECT command, because the UE already has the EF_FCP's size information TLV in the USIM ASF's FCP.

In step 422, the UICC responds by sending EF_FCP contents of the USIM ADF (i.e., RESPONSE [EF_FCP Contents]) to the UE. The UE reads the EF_FCP file using the SFI and obtains the contents of the EF_FCP received from the UICC.

In step 424, the UE processes the FCP contents to extract and store the file size information.

In step 426, for example, when an EF_LI is to be selected, which as per 3GPP 31.102 specification does not have a fixed maximum size, the UE sends a READ command (i.e., READ EF_LI 0x6F05]) to the UICC.

In step 428, the UICC responds by sending EF_LI contents to the UE. The content of the EF_FCP is then read by the UE to determine the actual size of the EF_LI. Specifically, the content of the EF_FCP is directly read by using the SFI to perform the READ command. No SELECT command is used as the EF_LI's size information TLV object is already available in the EF_FCP.

Figure 5:
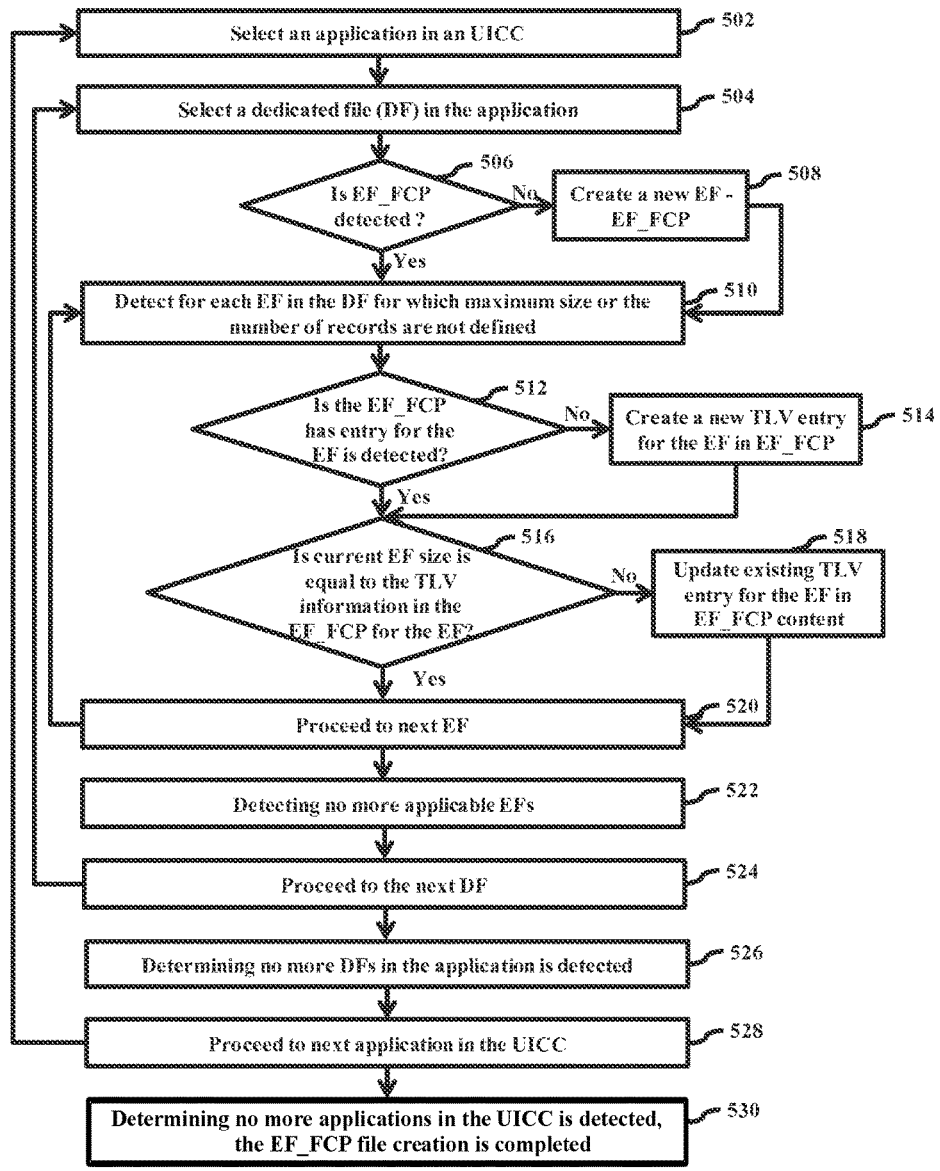
FIG. 5 is a flow diagram illustrating a method for creating or updating an FCP file corresponding to EFs in a UICC, according to an embodiment of the present disclosure.

FIG. 5 is a flow diagram illustrating a method for creating or updating an FCP file corresponding to an EF in a UICC, according to an embodiment of the present disclosure. For example, the sequence of steps can be performed inside the UICC by using a microcontroller, a microprocessor, or any computer readable storage medium.

Referring to FIG. 5, in step 502, an application (i.e., listed in EF-DIR) is selected in the UICC. For example, the application may include the USIM, the SIM, the ISIM, or the CSIM.

In step 504, a DF in the application is selected.

In step 506, it is determined if the EF-FCP file is detected or not in the DF

If the EF-FCP file is detected in the DF, in step 506, then detect, in step 510, one or more EF's in DF whose maximum file size or number of records is not defined as per the specification.

If it is determined, in step 506, that the EF-FCP file is not detected, then a new EF_FCP file created in step 508 and each EF in the DF for which the maximum size or the number of records is not defined is detected in step 510.

In step 512, it is determined if the EF_FCP has an entry for the EF.

If it is determined, in step 512, that the EF_FCP has an entry for the EF, then it is determined whether the current EF size is equal to the TLV information in the EF_FCP for the EF in step 516. However, if it is determined, in step 512, that the EF_FCP has no entry for the EF, then a new TLV entry is created for the EF in the EF_FCP in step 514 and then it is determined whether the current EF size is equal to the TLV information in the EF_FCP for the EF in step 516.

If it is determined, in step 516, that the current EF size is equal to the TLV information in the EF_FCP for the EF, then the method proceeds to the next EF in the DF and the operation returns to step 510 for the next EF.

However, if it is determined, in step 516, that the current EF size is equal to the TLV information in the EF_FCP for the EF, then the existing TLV entry for the EF is updated in the EF_FCP content and then the method proceeds to the next EF in the DF. For example, the maximum size, the total number of records, the SFI, and/or any other values in the EF_FCP file may be updated.

In step 522, it is detected that no more applicable EFs are included in the DF, i.e., steps 510 to 520 have been performed on all applicable EFs in the DF.

In step 524, the method proceeds to a next DF and t steps 504 to 522 are repeated.

In step 526, it is determined that no more DFs in the application are detected.

In step 528, the method proceeds to a next application in the UICC and steps 502 to 526 are repeated.

In step 530, it is determined that no more applications in the UICC are detected, and that the EF_FCP file creation process is completed.

The various actions, acts, blocks, steps, etc., as illustrated in FIG. 5, may be performed in the order presented, in a different order or simultaneously. Further, in some embodiments, some actions, acts, blocks, steps, etc., may be omitted, added, modified, skipped, and etc., without departing from the scope of the disclosure.

Figure 6:
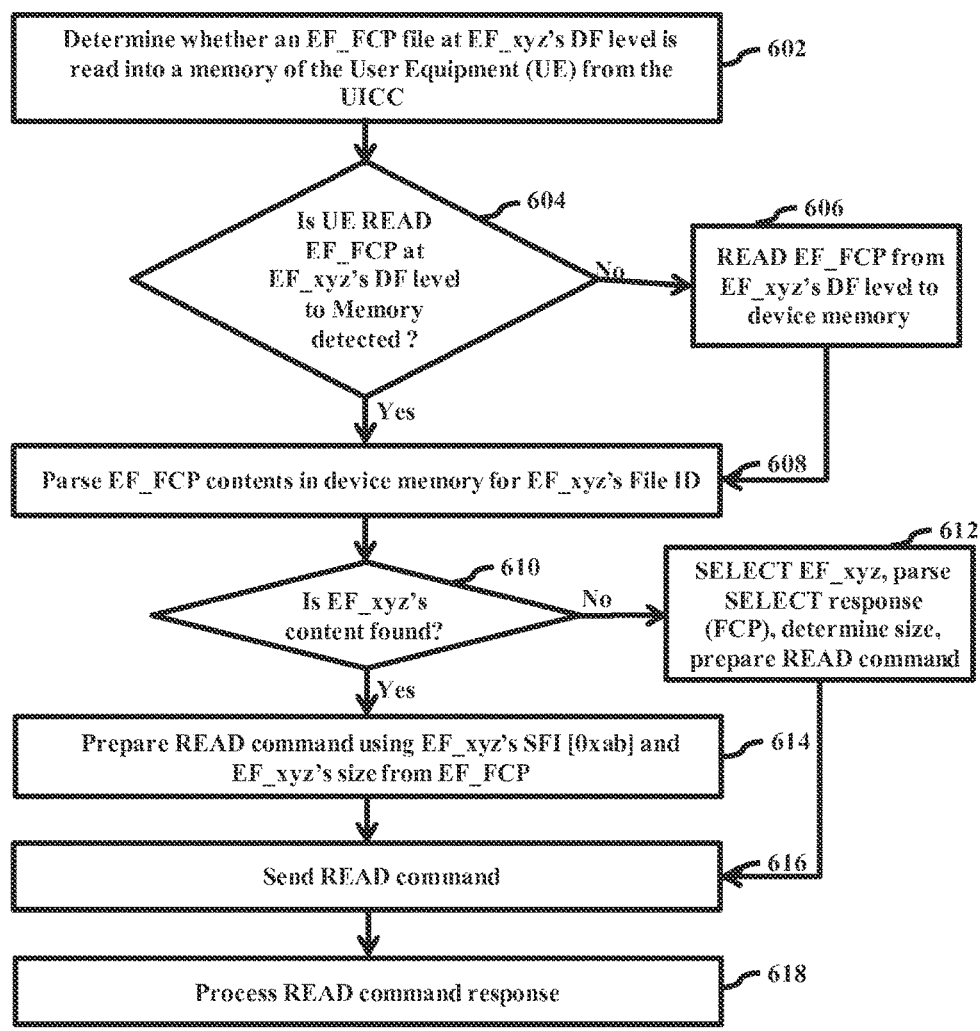
FIG. 6 is a flow diagram illustrating a UE method for using FCP information corresponding to an EF, according to an embodiment of the present disclosure.

FIG. 6 is a flow diagram illustrating a UE method for using FCP information corresponding to an EF, according to an embodiment of the present disclosure. Specifically, FIG.

6 illustrates an example in which the UE is accessing an EF, for which a size or total number of records are not defined and unknown.

Referring to FIG. 6, in step 602, the UE determines whether an EF_FCP file at EF_xyz's DF level is read into a memory of the UE from a UICC. For example, the memory may be a non-volatile memory.

If it is determined, in step 604, that the EF_FCP file at EF_xyz's DF level is read into the memory of the UE, then the UE parses EF_FCP contents in the memory of the UE for EF_xyz's file ID in step 608.

If it is determined, in step 604, that the EF_FCP file at EF_xyz's DF level is not read into the memory of the UE, the UE reads the EF_FCP file from EF_xyz's DF level to the memory of the UE in step 606, and then parses EF_FCP contents in the memory of the UE for EF_xyz's file ID in step 608.

If is the UE determines, in step 610, that the EF_xyz's content is detected, the UE prepares the READ command using EF_xyz's SFI and EF_xyz's size from the EF_FCP in step 614. For example, if the currently sought EF's entry is found in the EF_FCP, then the values are used to READ or UPDATE the EF using the SFI and the values from the EF_FCP.

However, if it is determined, in step 610, that the EF_xyz's content is not, the UE selects EF_xyz, parses the SELECT response, determines the size, prepares the READ command, and sends the READ command to the UICC in step 612.

In step 614, the UE prepares the READ command using EF_xyz's SFI [0xab] and EF_xyz's size from the EF_FCP.

In step 616, the UE sends the READ command to the UICC.

In step 618, the UE processes a READ command response.

Although FIG. 6 is described with the sequence of steps being performed by the UE, alternatively, the sequence of steps may be performed by a microcontroller, a microprocessor, or using instructions stored in any computer readable storage medium.

The various actions, acts, blocks, steps, etc., as illustrated in FIG. 6, may be performed in the order presented, in a different order or simultaneously. Further, in some embodiments, some actions, acts, blocks, steps, etc., may be omitted, added, modified, skipped, etc., without departing from the scope of the disclosure.

Figure 7:
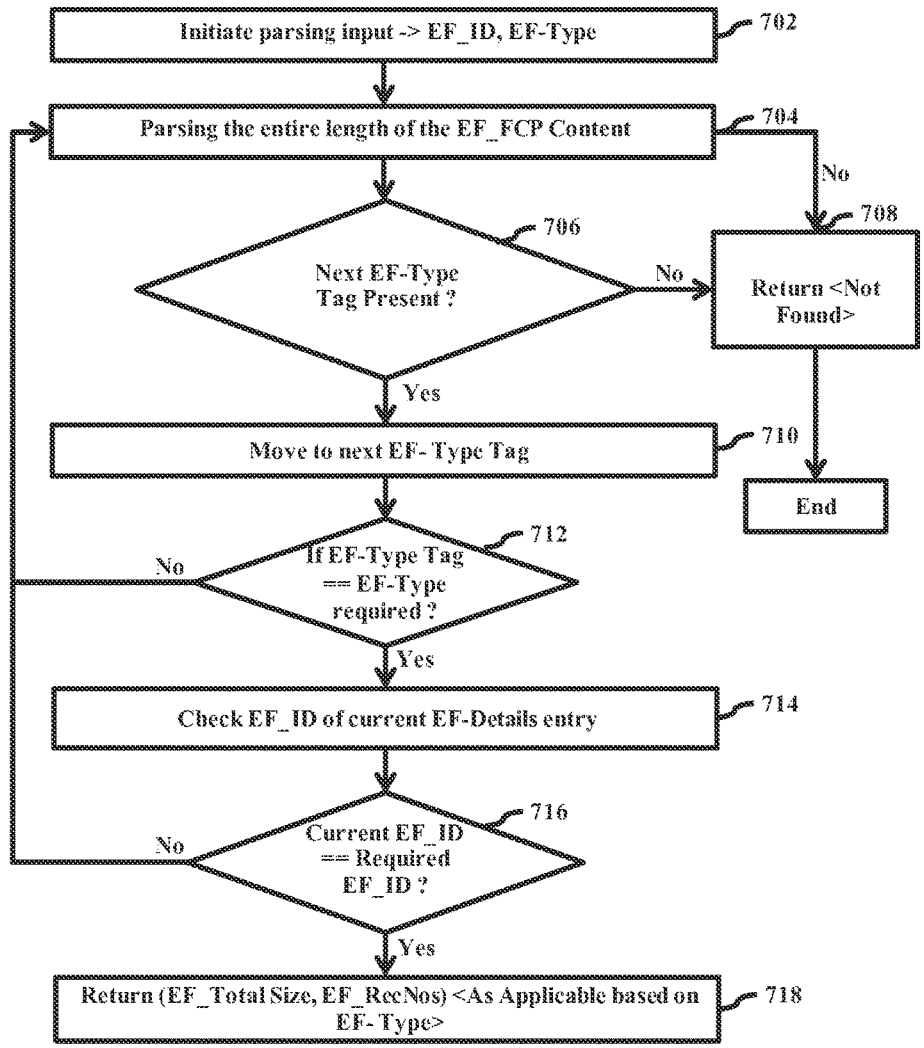
FIG. 7 is a flow diagram illustrating a UE method for parsing and using FCP values corresponding to an EF, according to an embodiment of the present disclosure.

FIG. 7 is a flow diagram illustrating a UE method for parsing and using FCP values corresponding to an EF, according to an embodiment of the present disclosure.

Referring to FIG. 7, in step 702, the UE initiates parsing of EF_FCP content. The input for parsing the EF_FCP content includes a file ID and its file type (e.g., transparent type, cyclic type, linear type, or fixed type).

In step 704, the UE parses the entire length of the EF_FCP content. However, if the entire EF_FCP contents are parsed and the sought content is not found, then a "Not Found" error message is returned.

If it is determined, in step 706, that a next available file type tag value is detected, the method the UE moves to the next file type tag in step 710.

If it is determined, at step 706, that the next available file type tag value is not detected the method UE returns the "Not Found" error message in step 708.

If it is determined, in step 712, that the next available file type tag value is the same as the sought file's type, the UE checks the next available file type tag value (i.e., EF_ID of current EF-Details entry) in step 714. If it is determined, at step 712, that the next available file type tag value is not the same as the sought file's type, the method returns to step 704.

If it determined in step 716 that the current EF_ID tag's value is the same as the required file ID, the method UE returns the total size of the EF and the total number of records as applicable, based on the EF-Type, in step 718. However, if it is determined in step 716 that the current EF_ID tag's value is not the same as the sought file ID, the method returns to step 704.

Although FIG. 7 is described with the sequence of steps being performed by the UE, alternatively, the sequence of steps may be performed by a microcontroller, a microprocessor, or using instructions stored in any computer readable storage medium.

The various actions, acts, blocks, steps, etc., as illustrated in FIG. 7, may be performed in the order presented, in a different order or simultaneously. Further, in some embodiments, some actions, acts, blocks, steps, etc., may be omitted, added, modified, skipped, etc., without departing from the scope of the disclosure.

Figure 8:
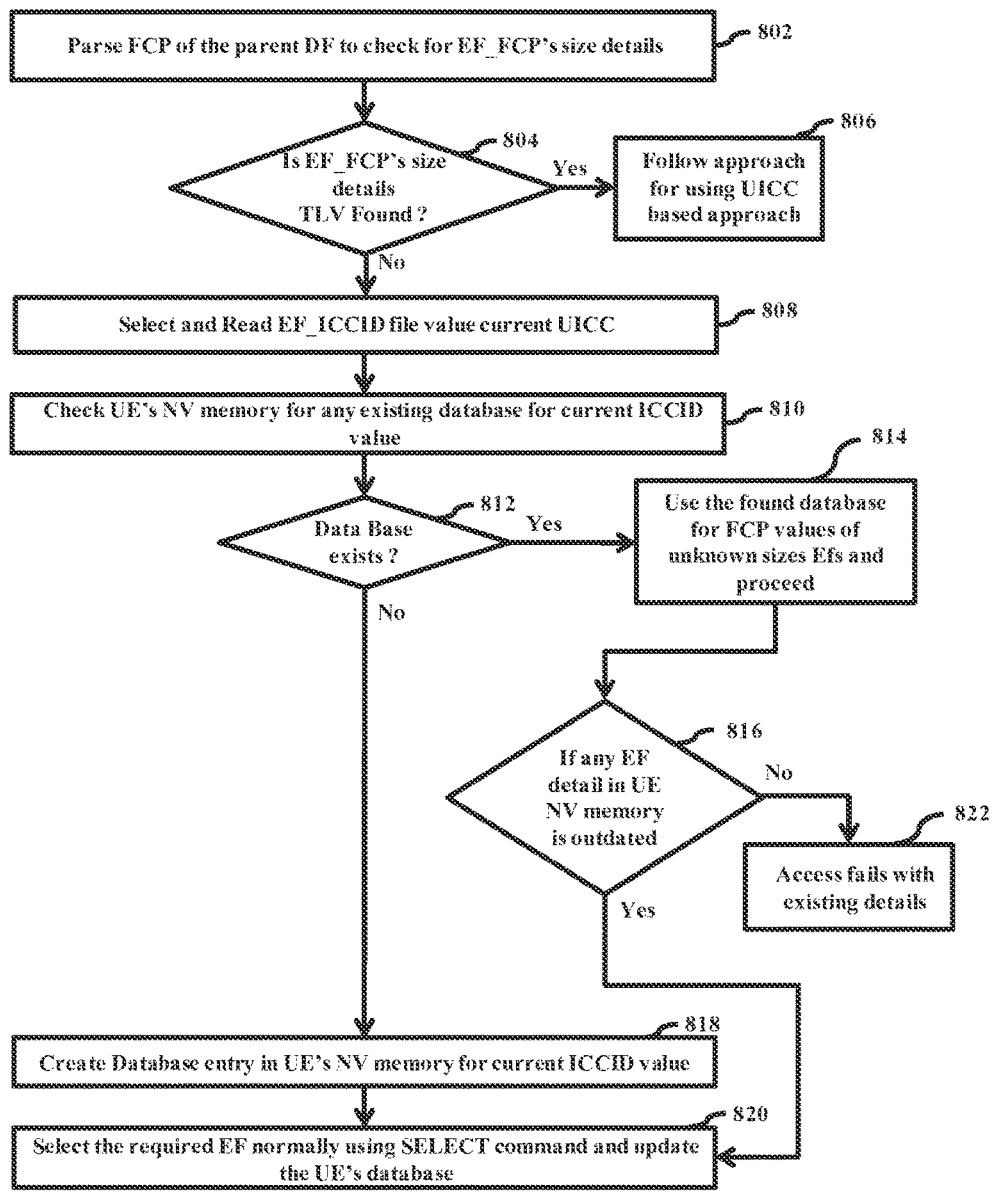
FIG. 8 is a flow diagram illustrating a UE method for creating or updating an FCP file corresponding to an EF, according to an embodiment of the present disclosure.

FIG. 8 is a flow diagram illustrating a UE method for creating or updating an FCP file corresponding to an EF, according to an embodiment of the present disclosure.

Referring to FIG. 8, in step 802, the UE parses FCP values of a parent DF to check for an EF_FCP's size information.

If the EF_FCP size values and TLV are detected in step 804, the UE uses a UICC based approach.

However, if the EF_FCP size values and TLV are not detected in step 804, the UE selects and reads the EF_ICCID file value of the current UICC as an index in step 808.

In step 810, the UE checks a memory of the UE for any existing database for storing the current ICCID value.

If it is determined that the database exists in step 812, the UE uses the obtained database for the FCP values of the unknown sizes of the EFs. However, if the database is not detected in step 812, the UE creates a database entry in the memory of the UE with the EF_ICCID value of the current UICC as an index in step 818.

If the UE determines that any EF detail in the memory of the UE is outdated in step 816, the UE selects the required EF normally using the SELECT command, parses the FCP values returned for the SELECT command, and updates the database entry in the memory in step 820.

If the UE determines that no EF details in the memory of the UE are outdated in step 816, the UE concludes that access fails with the existing details in step 822.

Although FIG. 8 is described with the sequence of steps being performed by the UE, alternatively, the sequence of steps may be performed by a microcontroller, a microprocessor, or using instructions stored in any computer readable storage medium.

The various actions, acts, blocks, steps, etc., as illustrated in FIG. 8, may be performed in the order presented, in a different order or simultaneously. Further, in some embodiments, some actions, acts, blocks, steps, etc., may be omitted, added, modified, skipped, etc., without departing from the scope of the disclosure.

Figure 9:
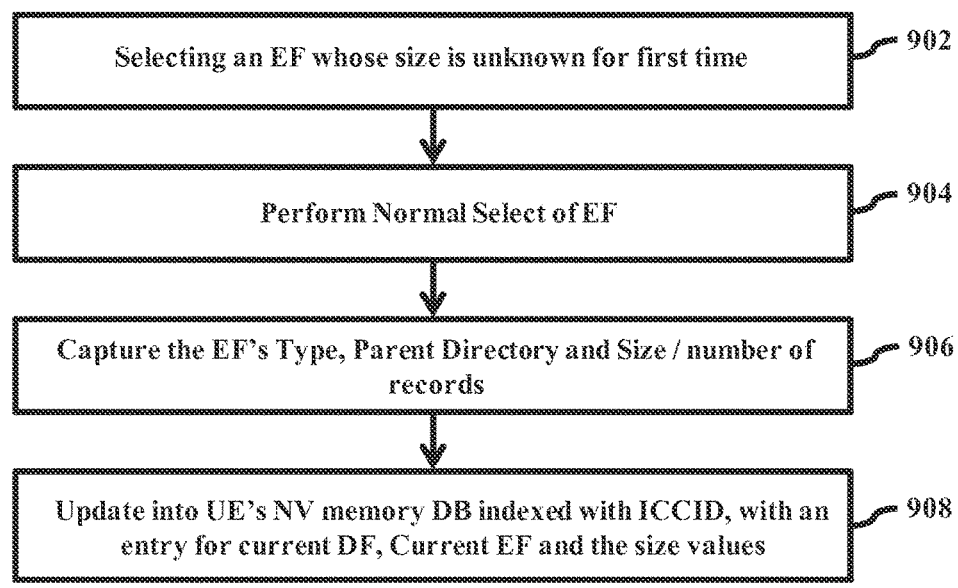
FIG. 9 is a flow diagram illustrating a UE method for creating FCP values, according to an embodiment of the present disclosure.

FIG. 9 is a flow diagram illustrating a UE method for creating FCP values, according to an embodiment of the present disclosure.

Referring to FIG. 9, in step 902, the UE selects an EF whose maximum size is not defined, as per specification, having no entry in a memory of the UE, and having no EF_FCP support from the UICC.

In step 904, the UE selects the EF using the SELECT command.

In step 906, the UE parses FCP values returned by the UICC, and extracts the size and/or number of records details as applicable.

In step 908, the UE updates the values in the memory database of the UE, indexed with the ICCID, with the entry for the current DF, the current EF, and the size values.

Although FIG. 9 is described with the sequence of steps being performed by the UE, alternatively, the sequence of steps may be performed by a microcontroller, a microprocessor, or using instructions stored in any computer readable storage medium.

The various actions, acts, blocks, steps, etc., as illustrated in FIG. 9, may be performed in the order presented, in a different order or simultaneously. Further, in some embodiments, some actions, acts, blocks, steps, and the like may be omitted, added, modified, skipped, etc., without departing from the scope of the disclosure.

Figure 10:
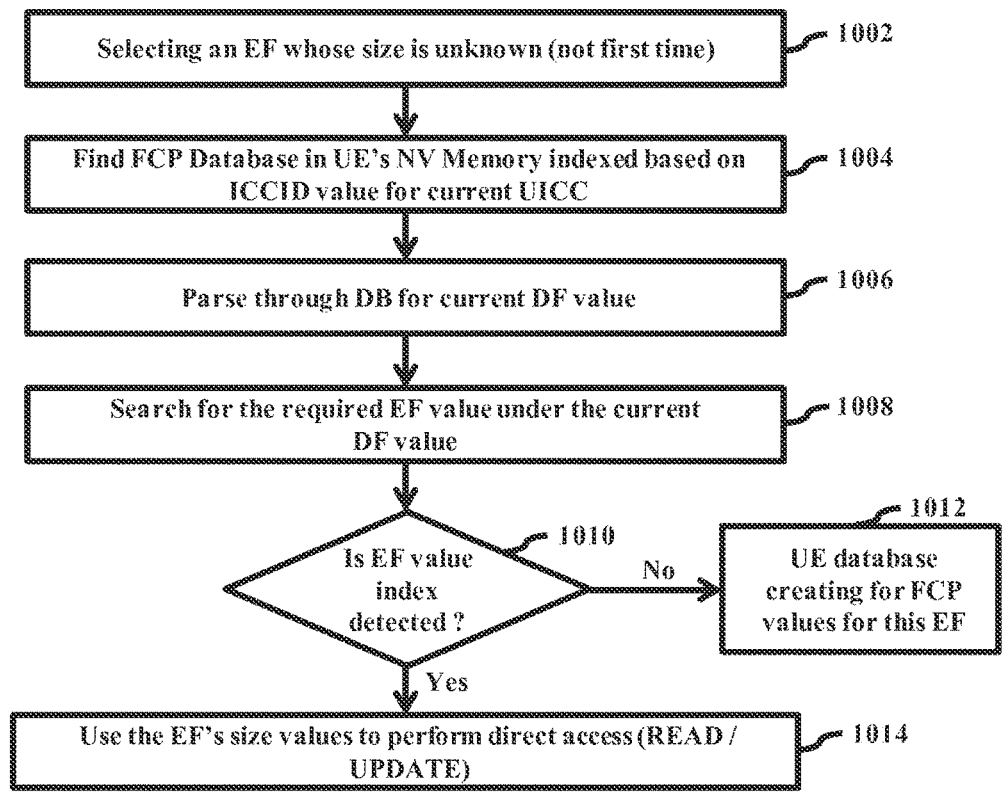
FIG. 10 is a flow diagram illustrating a UE method for using FCP values, according to an embodiment of the present disclosure.

FIG. 10 is a flow diagram illustrating a UE method for using FCP values, according to an embodiment of the present disclosure.

Referring to FIG. 10, in step 1002, the UE selects an EF whose file size and number of records are unknown.

In step 1004, the UE finds an FCP database in a memory of the UE, indexed based on the current UICC's EF_ICCID value.

In step 1006, the UE parses through the database for the current DF value and sought EF combination.

In step 1008, the UE searches for the sought EF value under the current DF value.

If the UE detects the EF value index in step 1010, the UE returns the stored file size and the total number of records in order to perform the file access using the stored EF's values in step 1014. However, if the EF value index is not detected in step 1010, the UE creates FCP values for the EF in step 1012.

Although FIG. 10 is described with the sequence of steps being performed by the UE, alternatively, the sequence of steps may be performed by a microcontroller, a microprocessor, or using instructions stored in any computer readable storage medium.

The various actions, acts, blocks, steps, etc., as illustrated in FIG. 10, may be performed in the order presented, in a different order or simultaneously. Further, in some embodiments, some actions, acts, blocks, steps, etc., may be omitted, added, modified, skipped, etc., without departing from the scope of the disclosure.

FIGS. 11A-11D illustrate locations of an FCP file corresponding to an EF in various applications in a UICC, according to an embodiment of the present disclosure.

Figure 11A:
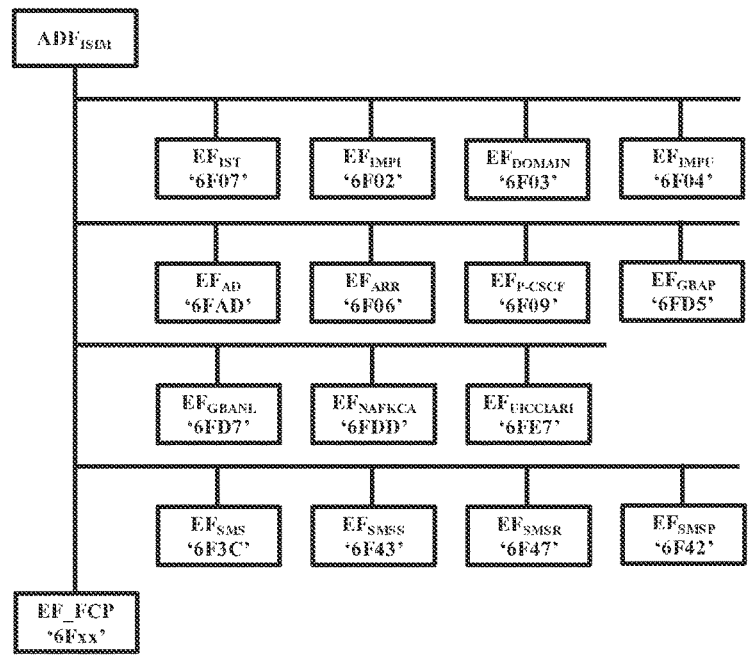
FIGS. 11A-11D illustrate a location of an FCP file corresponding to an EF in various applications in an UICC, according to an embodiment of the present disclosure.
Figure 11B:
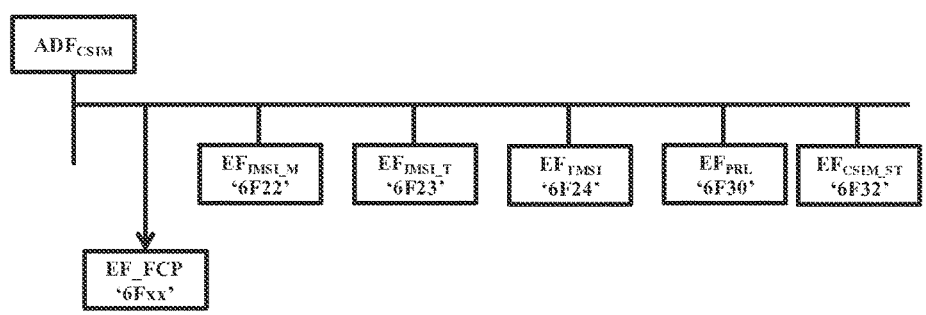
Figure 11C:
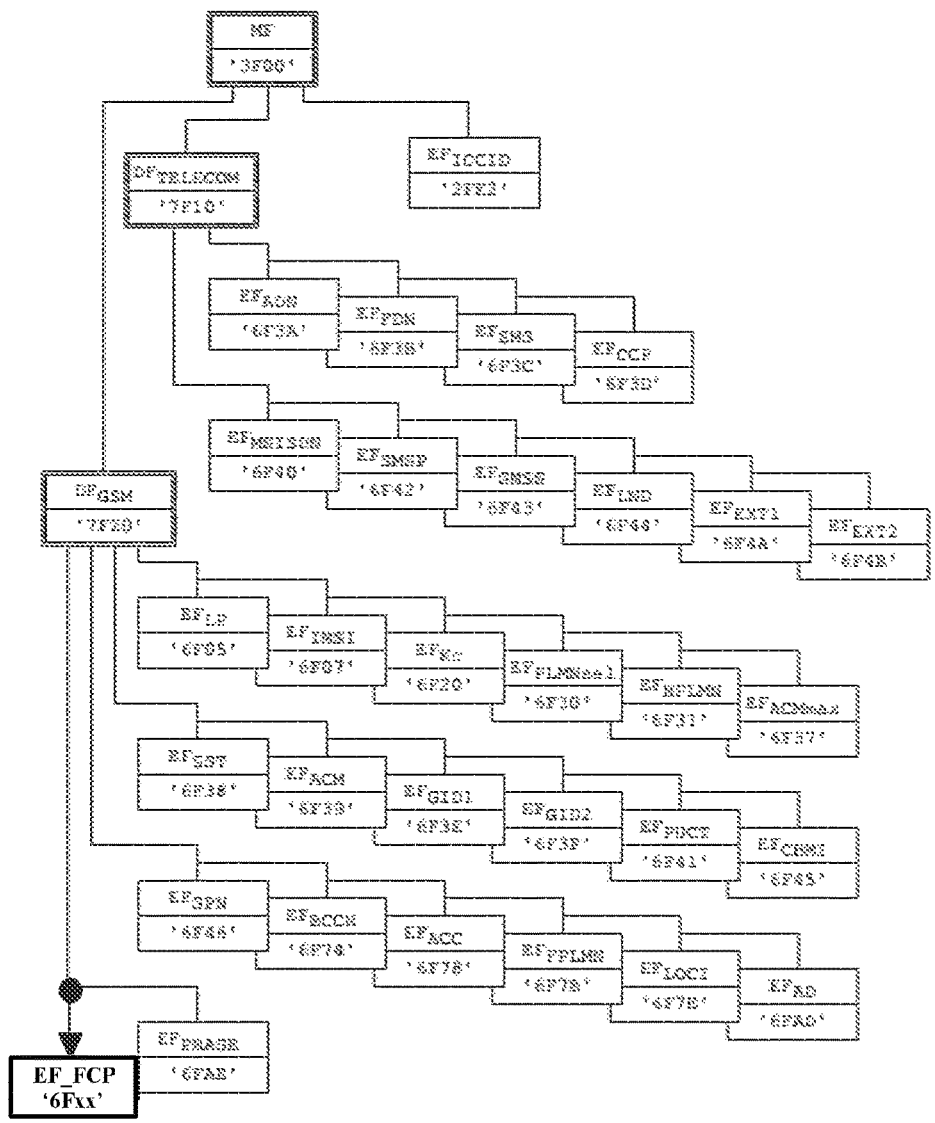
Figure 11D:
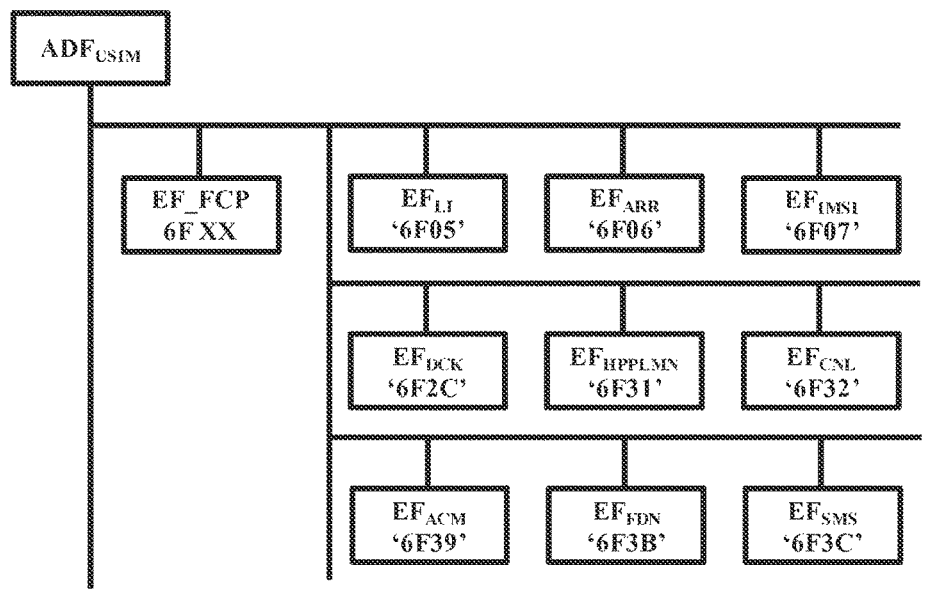

Specifically, the location of a new EF i.e., EF_FCP at the ADF ISIM level, is illustrated in FIG. 11A. The location of the new EF i.e., EF_FCP at the ADF CSIM level, is illustrated in FIG. 11B. The location of the new EF i.e., EF_FCP at the ADF SIM level, is illustrated in FIG. 11C. The location of the new EF i.e., EF_FCP at the ADF USIM level, is illustrated in the FIG. 11D.

Figure 12:
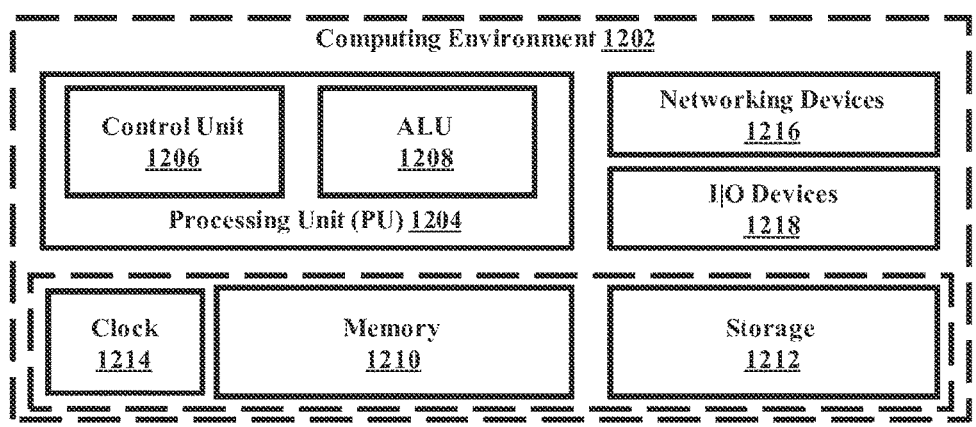
FIG. 12 illustrates a computing environment for optimizing access to UICC files in a UE, according to an embodiment of the present disclosure.

FIG. 12 illustrates a computing environment for optimizing access to UICC files in a UE, according to an embodiment of the present disclosure.

Referring to FIG. 12, the computing environment 1202 includes a processing unit 1204 that is equipped with a control unit 1206 and an Arithmetic Logic Unit (ALU) 1208, a memory 1210, a storage unit 1212, a clock chip 1214, a plurality of networking devices 1216, and a plurality Input/Output (I/O) devices 1218.

The processing unit 1204 processes instructions. The processing unit 1204 receives commands from the control unit 1206 in order to perform its processing. Further, any logical and arithmetic operations involved in the execution of the instructions are computed with the help of the ALU 1208. The overall computing environment 1202 may also include multiple homogeneous or heterogeneous cores, multiple Central Processing Units (CPUs) of different kinds, special media and other accelerators. Further, the plurality of process units may be located on a single chip or over multiple chips.

The algorithm, which includes instructions and codes for the implementation, are stored in either the memory unit 1210 or the storage 1212 or both. At the time of execution, instructions may be fetched from the corresponding memory 1210 or storage 1212, and executed by the processing unit 1204. The processing unit 1204 synchronizes the operations and executes the instructions based on the timing signals generated by the clock chip 1214.

The embodiments disclosed herein can be implemented through at least one software program running on at least one hardware device and performing network management functions to control the elements. The elements illustrated in FIGS. 1 through 12 include blocks that can be embodied as at least one of a hardware device, or a combination of hardware device and software module.

Embodiments herein provide a method for optimizing access to UICC files in a UE. The method includes storing at least one FCP file corresponding to a plurality of EFs. Further, the method includes directly sending at least one command to the UICC based on the least one FCP file, where the command includes one of a READ command or an UPDATE command.

Embodiments herein also provide a UE for optimizing access to UICC files. The UE includes a storage module configured to store at least one FCP file corresponding to a plurality of EFs. Further, The UE includes a controller module configured to directly send at least one command to the UICC based on the FCP file, where the command includes one of a READ command or an UPDATE command.

Embodiments herein also provide a UICC for optimizing access to UICC files in a UE. The UICC includes an UICC interface for interfacing with the UE, a UICC memory configured to store at least one FCP file corresponding to a plurality of EFs, and a UICC application toolkit configured to directly send at least one command to the UICC based on the FCP file, where the command includes one of a READ command and an UPDATE command.

Embodiments herein also provide a chip set configured to store at least one File Control Parameter (FCP) file corresponding to a plurality of Elementary Files (EFs) and send a command directly to a Universal Integrated Circuit Card (UICC), based on the at least one FCP file, wherein the command includes one of a READ command and an UPDATE command.

Embodiments herein also provide a chip set configured to interface with a User Equipment (UE) store at least one File Control Parameter (FCP) file corresponding to a plurality of Elementary files (EFs) and send a command directly to a Universal Integrated Circuit Card (UICC), based on the at least one FCP file, wherein the command includes one of a READ command and an UPDATE command.

Although the embodiments of the disclosure have been described above with reference to specific examples, it will be evident that various modifications and changes may be made to these embodiments without departing from the broader spirit and scope of the disclosure. Furthermore, the various devices, modules, and the like described herein may be enabled and operated using hardware circuitry, firmware, and/or software embodied in a machine readable medium.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method for accessing files included in a universal integrated circuit card (UICC) by a user equipment (UE), the method comprising:
   acquiring, by the UE, at least one file control parameter (FCP) file corresponding to a plurality of elementary files (EFs);
   storing, by the UE, the at least one FCP file; and
   sending, by the UE, a command to the UICC, based on the at least one FCP file,
   wherein the command includes one of a READ command and an UPDATE command, and
   wherein the at least one FCP file includes size information of each record associated with each of the plurality of EFs.

2. The method of claim 1, wherein the at least one FCP file is used to send the command directly to the UICC, without first retrieving FCP characteristics of at least one of the plurality of EFs using a SELECT command and a GET RESPONSE command.

3. The method of claim 1, further comprising storing, by the UE, an FCP file associated with an EF that is selected and read by the UE,
   wherein the stored FCP file associated with the EF is used by the UE to perform short file identifier (SFI) access in a power cycle.

4. The method of claim 1, wherein the at least one FCP file is stored in the UICC, at each directory level.

5. The method of claim 1, wherein the at least one FCP file is stored in a non-volatile memory of the UE, and
   wherein an integrated circuit card identifier (ICCID) value of the UICC is used as an index for storing the at least one FCP file.

6. The method of claim 1, wherein the at least one FCP file further comprises at least one of a fixed default short file identifier (SFI) value, a variable file size information, a total number of records, and tag length value (TLV) information.

7. The method of claim 1, wherein each of the at least one FCP file corresponds to an application in the UICC, and
   wherein the application includes one of a universal subscriber identity module (USIM), a subscriber identity module (SIM), an internet protocol (IP) multimedia services identity module (ISIM), and a code division multiple access (CDMA) SIM (CSIM).

8. A user equipment (UE) for accessing files included in a universal integrated circuit card (UICC), the UE comprising:
   a storage module configured to store at least one file control parameter (FCP) file corresponding to a plurality of elementary files (EFs); and
   a controller module configured to acquire the at least one FCP and send a command to the UICC, based on the at least one FCP file,
   wherein the command includes one of a READ command and an UPDATE command, and
   wherein the at least one FCP file includes size information of each record associated with each of the plurality of EFs.

9. The UE of claim 8, wherein the controller module is further configured to use the at least one FCP file to send the command directly to the UICC, without first retrieving FCP characteristics of at least one of the plurality of EFs using a SELECT command and a GET RESPONSE command.

10. The UE of claim 8, wherein the storage module is further configured to store an FCP associated with an EF that is selected and read in the UICC, and
    wherein the controller module is further configured to use the stored FCP associated the EF to perform short file identifier (SFI) access in a power cycle.

11. The UE of claim 8, wherein that at least one FCP file is stored in the UICC, at each directory level.

12. The UE of claim 8, wherein an integrated circuit card identifier (ICCID) value of the UICC is used as an index to store the at least one FCP file.

13. The UE of claim 8, wherein the at least one FCP file further comprises at least one of a fixed default short file identifier (SFI) value, a variable file size information, a total number of records, and tag length value (TLV) information.

14. The UE of claim 8, wherein each of the at least one FCP file corresponds to an application in the UICC, and
    wherein the application comprises one of a universal subscriber identity module (USIM), a subscriber identity module (SIM), an internet protocol (IP) multimedia services identity module (ISIM), and a code division multiple access (CDMA) SIM (CSIM).

15. A universal integrated circuit card (UICC) module for accessing UICC files in a user equipment (UE), the UICC module comprising:
    a UICC interface configured to interface with the UE and acquire at least one file control parameter (FCP) file corresponding to a plurality of elementary files (EFs);
    a UICC memory configured to store the FCP file; and
    a UICC application toolkit configured to send a command to a UICC based on the at least one FCP file,
    wherein the command includes one of a READ command and an UPDATE command, and
    wherein the at least one FCP file includes size information of each record associated with each of the plurality of EFs.

16. The UICC module of claim 15, wherein the at least one FCP file is used to send the command to the UICC, without first retrieving FCP characteristics of at least one of the plurality of EFs using a SELECT command and a GET RESPONSE command.

17. The UICC module of claim 15, wherein the UICC memory is further configured to store an FCP associated with an EF that is selected and read in the UICC memory, and
    wherein the stored FCP associated with the EF is used by the UE to perform short file identifier (SFI) access in a power cycle.

18. The UICC module of claim 15, wherein that at least one FCP file is stored at each directory level of UICC memory.

19. The UICC module of claim 15, wherein the at least one FCP file further comprises at least one of a fixed default short file identifier (SFI) value, a variable file size information, a total number of records, and tag length value (TLV) information.

20. The UICC module of claim 15, wherein each of the at least one FCP file corresponds to an application in the UICC, and
    wherein the application comprise one of a universal subscriber identity module (USIM), a subscriber identity module (SIM), an internet protocol (IP) multimedia services identity module (ISIM), and a code division multiple access (CDMA) SIM (CSIM).

* * * * *